US006973490B1

(12) United States Patent
Robertson et al.

(10) Patent No.: US 6,973,490 B1
(45) Date of Patent: Dec. 6, 2005

(54) METHOD AND SYSTEM FOR OBJECT-LEVEL WEB PERFORMANCE AND ANALYSIS

(75) Inventors: Niel Robertson, Boulder, CO (US); Christopher Burton, Lafayette, CO (US)

(73) Assignee: Savvis Communications Corp., Town & Country, MO (US)

( * ) Notice: Subject to any disclaimer, the term of this patent is extended or adjusted under 35 U.S.C. 154(b) by 521 days.

(21) Appl. No.: 09/603,174

(22) Filed: Jun. 23, 2000

Related U.S. Application Data

(60) Provisional application No. 60/140,542, filed on Jun. 23, 1999.

(51) Int. Cl.[7] ............................................. G06F 15/173
(52) U.S. Cl. ...................... 709/224; 709/202; 709/203; 709/223
(58) Field of Search ................................ 709/200–203, 709/217–219, 223–224, 227–229, 246, 249

(56) References Cited

U.S. PATENT DOCUMENTS

| | | | | |
|---|---|---|---|---|
| 6,148,335 A | * | 11/2000 | Haggard et al. ............ | 709/224 |
| 6,247,050 B1 | * | 6/2001 | Tso et al. .................... | 709/224 |
| 6,263,361 B1 | * | 7/2001 | Hoyer et al. ................ | 709/203 |
| 6,304,904 B1 | * | 10/2001 | Sathyanarayan et al. .... | 709/224 |
| 6,513,060 B1 | * | 1/2003 | Nixon et al. ................ | 709/203 |
| 6,564,342 B2 | * | 5/2003 | Landan ........................ | 709/224 |
| 6,681,232 B1 | * | 1/2004 | Sistanizadeh et al. ....... | 709/224 |
| 6,701,342 B1 | * | 3/2004 | Bartz et al. ................. | 709/200 |
| 6,708,137 B2 | * | 3/2004 | Carley ......................... | 709/224 |
| 6,738,813 B1 | * | 5/2004 | Reichman .................... | 709/224 |
| 6,813,248 B1 | * | 11/2004 | Boss et al. .................. | 709/203 |

OTHER PUBLICATIONS

Keynote Systems, "Keynote Systems Announces Free Performance Appraisals to Measure Quality of Service of Corporate Internet Sites", keynote.com/news/announcements/pr011698.html, Jan. 16, 1998.
Keynote Systems, "Keynote Systems Announces Global Solution to Measure and Validate Quality of Service on the Congested Internet", keynote.com/news/announcements/pr110496.html, Nov. 4, 1996.

(Continued)

*Primary Examiner*—Bharat Barot
(74) *Attorney, Agent, or Firm*—Davidson Berquist Jackson & Gowdey, LLP

(57) ABSTRACT

A system for internet performance monitoring and analysis includes at least one agent connected to a computer network and adapted to collect the object-level data and to measure the access parameters while the collection of the object-level data occurs. Appreciably, the system may a plurality of agents located at distributed points throughout a global computer network. Each agent is adapted to collect the object level data and to measure access parameters while the collection of the object-level data occurs. The collective measurements when taken at different points throughout the network provide functional tools to assess the distribution of the remotely readable documents.

21 Claims, 6 Drawing Sheets

OTHER PUBLICATIONS

E-Commerce Times, "Keynote Announces Content Analysis Service", ecommercetimes.com/news/articles/9812097-.shtml, Dec. 9, 1998.

Keynote Systems, Measure, "Assure and Improve Web-Site Performance 24 Hours a Day from 35 Cities Worldwide", keynote.com/product/prod_subscriptions.html, Feb. 5, 1999.

Keynote Systems, "Professional Services: Building World-Class E-commerce Sites", keynote.com/product/prod_proservices.html, Feb. 5, 1999.

Keynote Systems, "Custom Agents", keynote.com/product/prod_priviateagents.html, Feb. 5, 1999.

Keynote Systems, "The Interaction of Web Content and Internet Backbone Performance", keynote.com/downloads/wp_compdata.html, Feb. 5, 1999.

Keynote Systems, "Measuring and Improving Your E-Commerce Web-Site Performance with Keynote Perspective", keynote.com/downloads/wp_ecommerce.html, Feb. 5, 1999.

Keynote Systems, "Keynote Systems Adds Three New Delivery Features to its Internet Measurement and Diagnostic Service", keynote.com/news/announcements/pr012599.html, Jan. 25, 1999.

Keynote Systems, "Keynote Systems Announces New Index to Track Performance and Availability of Online Brokerage Web Sites", keynote.com/news/announcements/pr121498.html, Dec. 14, 1998.

Keynote Systems, "Keynote Systems Announces New Content-Analysis Service to Improve Web-Page Download Times for Media and Catalog Shopping Sites", keynote.com/news/announcements/pr120798.html, Dec. 7, 1998.

Keynote Systems, "Keynote Internet Performance Bulletin: Online Stock-Market Trading Frenzy Produced Minimal Impact on General Internet Users", http://www.keynote.com/news/announcements/pr090398.html, Sep. 3, 1998.

Keynote Systems, "Keynote Systems Announces Low-Cost Single City Subscriptions to Its Internet Performance and Diagnostic Service", http://www.keynote.com/news/announcements/pr060598.html, Jun. 5, 1998.

* cited by examiner

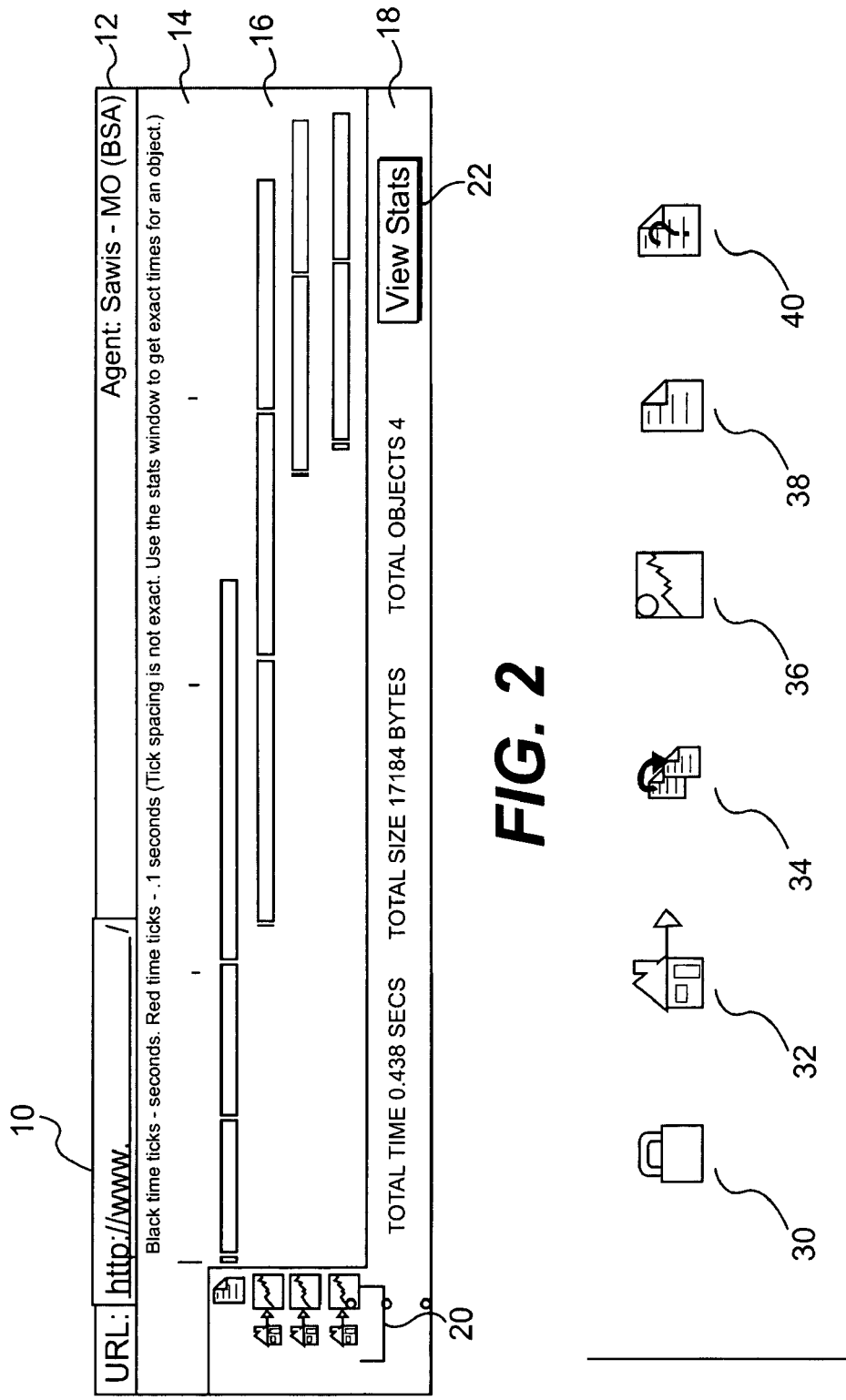

| URL CONFIGURATION | |
|---|---|
| URL DESCRIPTION | Http://www. |
| USER AGENT | Mozilla/4.05[En] (WinNt) |
| DOWNLOAD FRAMES | Yes |
| DOWNLOAD IMAGES | Yes |
| ALLOW REDIRECTS | Yes |
| USE PROXY AUTH | No |
| USE WEB AUTH | No |
| USE COOKIES | Yes |
| KEEP NEW COOKIE | Yes |
| PROXY USERNAME | |
| POST DATA | (Enter Post Data Here) |
| COOKIE DATA | |

*FIG. 7*

METHOD AND SYSTEM FOR OBJECT-LEVEL WEB PERFORMANCE AND ANALYSIS

CROSS REFERENCE TO RELATED APPLICATION(S)

This application claims the benefit of U.S. Provisional application Ser. No. 06/140,542 filed Jun. 23, 1999, which is incorporated herein by reference.

BACKGROUND OF THE INVENTION

1. Field of the Invention

This invention relates to communication systems having remotely readable digital documents, and more particularly to the performance of communication systems having remotely readable digital documents.

2. Description of the Related Art

Because the Internet evolved from the ARPAnet, a research experiment that supported the exchange of data between government contractors and (often academic) researchers, an on-line culture developed that is alien to the corporate business world. Although the Internet was not designed to make commercialization easy, Internet publishing and e-commerce have rapidly evolved. In part it is the very ease that anyone can publish a document that is accessible by a large number of people that makes electronic publishing attractive. Setting up e-commerce provides low overhead while reaching a worldwide market 24 hours a day. The growth and popularity of the Internet is providing new opportunities for commercialization including but not limited to Web sites driven by electronic commerce, ad revenue, branding, database transactions, and intranet/extranet applications.

Transaction Control Protocol/Internet Protocol (TCP/IP) is the communications standard between hosts on the Internet. TCP/IP defines the basic format of the digital data packets on the Internet allowing programs to exchange information with other hosts on the Internet.

Domain names direct where e-mail is sent, files are found, and computer resources are located. They are used when accessing information on the World Wide Web (Web) or connecting to other computers through Telnet. Internet users enter the domain name, which is automatically converted to the Internet Protocol address by the Domain Name System (DNS). The DNS is a service provided by TCP/IP that translates the symbolic name into an IP address by looking up the domain name in a database.

E-mail was one of the first services developed on the Internet. Today, e-mail is an important service on any computer network, not just the Internet. E-mail involves sending a message from one computer account to another computer account. E-mail is used to send textual information as well as files, including graphic files, executable file, word processing and other files. E-mail is becoming a popular way to conduct business over long distances. Using e-mail to contact a business associate can be faster than using a voice telephone, because the recipient can read it at a convenient time, and the sender can include as much information as needed to explain the situation.

In 1989, researchers at CERN wanted to provide a better method for widely dispersed groups of researchers to share information. The researchers needed a system that would enable them to quickly access all types of information with a common interface. By the end of 1990, researchers at CERN had a textual browser and a graphical browser developed.

A browser is an application that knows how to interpret and display hypertext documents that are located on the Web. Hypertext documents contain commands, references and links to other text and documents. This allows a reader to quickly access related text. In addition to text, many documents contain graphics, audio and animation.

HTTP (HyperText Transfer Protocol) is an application-level protocol for distributed, collaborative, hypermedia information systems. It is a generic, stateless, object-oriented protocol which can be used for many tasks, such as name servers and distributed object management systems, through extension of its request methods (commands). A feature of HTTP is the typing and negotiation of data representation, allowing systems to be built independently of the data being transferred. HTTP is described in a working document of the Internet Engineering Task Force (IETF), entitled "Hypertext Transfer Protocol—HTTP/1.1" dated Nov. 22, 1995, which is incorporated herein by reference.

Hypertext Markup Language (HTML) is an authoring software language used to create Web pages. HTML is basically ASCII text surrounded by HTML commands in angle brackets, which are then interpreted by a browser. Standard Generalized Markup Language (SGML) is a text-based language for describing the content and structure of digital documents. SGML documents are viewed with transformers, which render SGML data the way Web browsers render HTML data. Extensible Markup Language, is a pared-down version of SGML, designed especially for Web documents. It enables designers to create their own customized tags to provide functionality not available with HTML.

A Uniform Resource Locators (URLs) is a pointer or link to a location. The URL contains a transmission protocol, such as HyperText Transfer Protocol (HTTP), a domain name of the target computer system, a page identifier and a bookmark.

Commercialization of the Internet has been made possible largely through the development of the wide spread use of web pages in which file containing text, graphics, sound and video media are combined and displayed to the user as an integrated document. The combination of these files often requires that accessing files that may be stored on multiple servers that are owned and operated by different companies and are located at geographically separate locations. To the end user accessing the web page, the files are combined to form an integrated media presentation.

However, bottlenecks and traffic jams on the Internet reduce overall system performance and have a direct negative impact on commercialization. Accordingly, there is a need to provide businesses with an accurate, objective measurement of Web site performance from the end user's point of view. Thus, the need exists for a way to provide web site developers with information relating to the way in which the files that make up the web page are transmitted to the end user.

SUMMARY OF THE INVENTION

The present invention is a method for internet performance monitoring and analysis comprising the steps of collecting object-level data of remotely readable documents, and measuring access parameters to the object-level data, during the collection process.

A system for carrying out this method includes at least one agent connected to a computer network and adapted to collect the object-level data and to measure the access parameters while the collection of the object-level data occurs.

In another aspect of the present invention, an embodiment of the present invention includes a plurality of agents located at distributed points throughout a global computer network. Each agent is adapted to collect the object level data and to measure access parameters while the collection of the object-level data occurs. The collective measurements when taken at different points throughout the network provide functional tools to assess the distribution of the remotely readable documents.

BRIEF DESCRIPTION OF THE DRAWINGS

A more complete understanding of the present invention may be obtained from consideration of the following description in conjunction with the drawings in which:

FIGS. 2–7 are diagrams of screen displays illustrating information measured and reported by the present invention.

DETAILED DESCRIPTION OF VARIOUS ILLUSTRATIVE EMBODIMENTS

Although the present invention, a method and system for measuring and analyzing performance of a remotely readable document, is particularly well suited for use in connecting Internet users and shall be so described, the present invention is equally well suited for use in other network communication systems such as an Intranet. The term remotely readable document provides a general description of documents which includes HTML documents commonly referred to as web pages, but is not intended to be limited to the HTML standard. Similarly, the use of the term web page used in describing the preferred embodiments is provided as a common term to facilitate understanding of the invention; however, the preferred embodiments are not intended to be limited to the HTML format and should be interpreted broadly to refer to the transfer of information in any format. Furthermore, the term browser, a generic reference to a computer application for downloading and displaying remote documents under the HTTP, is used in describing the preferred embodiments to facilitate understanding of the invention; but the preferred embodiments should be interpreted to refer to applications for downloading and displaying remote documents under any transfer protocol standard.

Figure 1:
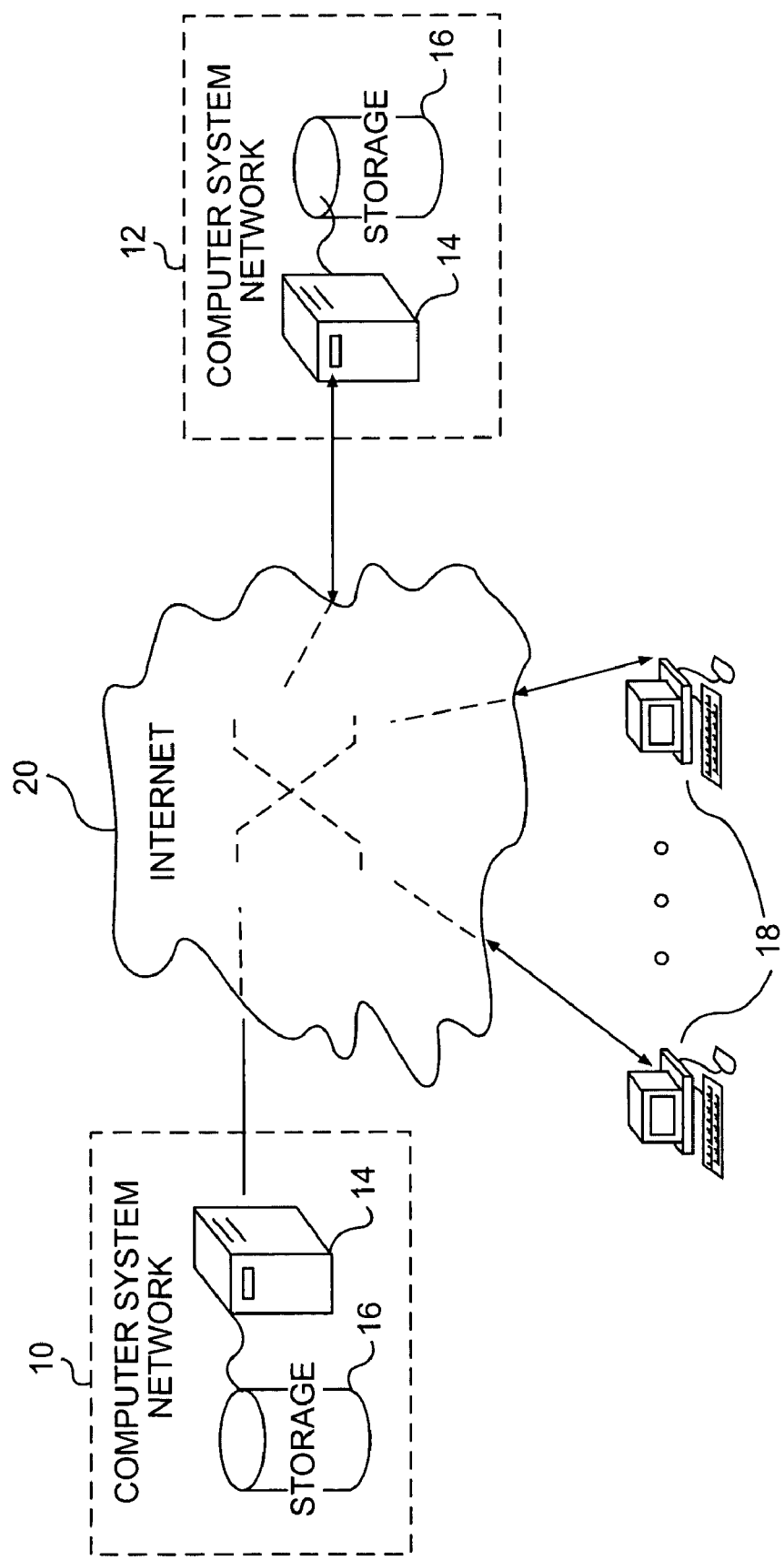
FIG. 1 is a block diagram of interconnected computer system networks employing the present invention.

Referring to FIG. 1 there is shown an overview of interconnected computer system networks. Each computer system network 10 and 12 contains a local computer processor unit 14 that is coupled to a local data storage unit 16. The local computer processor unit 14 is selectively coupled to a plurality of users 18 through the Internet 20.

A user 18 locates and clicks on to a particular Web page, the content of which is located on the local data storage unit 16 of the computer system network 10, to access the content of the Web page. The Web page may contain links to other computer systems and other Web pages. Advantageously, the present invention provides network performance measurements from an end-user's perspective in which the download time of the files that makes up the web page is measured. By utilizing this measurement of Web site performance, businesses are able to pinpoint and solve critical performance issues. Moreover, the present invention provides for the performance measurements to occur at different geographic locations, between different proprietary systems and on different hardware platforms across the Internet.

The speed and performance of downloading Web pages is complex and depends on many variables, the Web site itself, the internet service providers, the backbone network companies and the end-user configurations. Many different factors can contribute to poor performance. Design problems, system outages, hardware and software failures, and overloads, can occur in all the major components that make up the connection from end-user to Web server. Performance measurements can help identify when the problem occurred, the cause of the problem. Examples of problems by major category are: end-user, ISP; backbone providers; web site-servers; and web page content.

End-User—Slow access speed, browser incompatibilities, and system configuration problems.

ISP (Internet Service Provider)—Poor DNS architecture, server network congestion, inadequate peering arrangements, feature overload.

Backbone Providers—Congestion due to under provisioning facilities or routers, hardware failures, poor performance under traffic overload.

Web Site Servers—Servers and local network under engineered, poor load balancing, poor caching strategies, overloads from ad banners or content from off site servers.

Web Page Content—Audio or visual objects too time consuming, design problems in handling transactions. Being able to tell where the faults and delays occurred, determining avenues of correction, and verifying the success of those changes are advantages obtained from measuring Web site performance.

The present invention provides a real-time performance monitoring system comprising a user interface component and a performance-monitoring component. Information about the transfer of files making a web page is collected by the performance-monitoring component and transmitted to the user interface component.

The user interface is concerned with displaying performance data to a user in a way that helps the user understand how well a web server or servers have satisfied an end user's request to download a web page. Since the web page is a number content files such as HTML text, scripts, graphics, sound that needs to be individually downloaded to a user's browser, these components may come from different servers having unique performance characteristics and located at different places in the vast Internet topology. The user interface portion provides a display of the timing for a sample download of the different component files of a single web page, showing the relative timelines of each component as it is downloaded.

The system measures all data elements required to accurately represent the end-user experience and provide the information necessary to achieve optimal Web site performance and effectively manage vendors. Data elements measured and reported by the user interface include:

DNS Lookup Time—the average time required to translate a host name into an IP address, which the browser needs to communicate with the Web server.

Connection Time—the average time it takes to establish a connection to the Web server across the network. This includes the construction of the TCP/IP connection and all the associated "handshaking" that occurs within the process.

Request Time—the average time it takes to send the URL request (and associated HTTP request headers) to the connected Web server.

Response Time—the average time it takes for the Web server to start responding with content.

Connection Teardown Time—the time it takes to tear down the socket connection (the equivalent of saying goodbye and hanging up the phone) between the client and the server.

End-To-End Time—the overall time it takes from when the first DNS request is made until the last byte of the last object comes back. This is equivalent to clicking on a link in your browser and waiting for the browser to say, "document done" at the bottom.

Size of Content—the total size of all content on a Web page (associated images and other objects).

Throughput—measures, in bytes/second, how quickly data was transferred from the server to the user's browser.

Object Counts—the number and types of objects per hour included on a page.

The present invention method and system for Internet performance monitoring and analysis is accessed from a primary menu. For a particular URL the Status page is used to view the Web Performance Timeline page for that URL. The Web Performance Timeline is a tool designed to measure Web site performance. The Web Performance Time Line allows a Web site engineer to objectively examine the experience of transferring a Web page from a server to a browser and examine that Web page's performance from the end-user perspective. Additionally, the Web Performance Time Line allows a Web site engineer to objectively trace the transfer of a Web page on a server to a browser and examine the performance of the network and the various servers in response to a Web page download request, from the user's perspective. The Web Performance Time Line measures every object on a Web page and shows what the object is, where it originated, and what the performance characteristics of the object were, in real-time. Web pages are constructed of many different types of objects: text files, graphics, Java applets, sound files, etc. These objects may have completely different performance characteristics. They may originate from different sources. Web sites often have multiple Web servers that provide the objects that are combined to create an Web page. A common example is an ad banner that is served from an ad network. In order for a completed Web page to come back to the end-user in a timely fashion, not only must the main Web site's servers work correctly, but the ad network's servers must work efficiently as well. If one of these object serving components malfunctions or performs inefficiently, the end-users may experience a slowly-loading or incomplete web page. There are four main sections of the Web Performance Timeline screen: Object View with access to the Stats View Window; Timeline Legend; Web Page Server Summary; and URL Configuration.

Referring to FIG. 2, there is shown the Object View at the top of the Web Performance Timeline page. It has the following components URL 10, Agent 12, timing tick marks 14, object performance characteristic rows 16, summary footer 18, and Icon columns 20.

The URL 10 shows which page/URL you are measuring. The Agent 12 shows which DCA (Data Collection Agent) you are utilizing for your evaluation.

The timeline to be scaled horizontally by the total download time for the page being measured. At the top of the Object View timeline table there is a row of timing tick marks 14. The large ticks mark seconds. Each small tick mark is one 10th of a second. The timing tick marks 14 are scaled across the timeline dynamically, based on the total download time for the page.

The object performance characteristic rows 16 include for each object on the Web page causes a new row to be created in the Object View timeline table. When each object is downloaded, the browser goes through a specific process:

1. Resolve DNS for the hostname of the object (might already be cached)
2. Connect to the server
3. Request the object
4. Wait for the response
5. Download the data
6. Disconnect from the server Each step is segmented by color on the horizontal row for an object. View the Timeline Legend to reference a color to its corresponding event in the download timeline for an object. The six download events are measured sequentially for each object. The corresponding event color bars are displayed horizontally to create a download timeline row for the object. Look at the download timeline for an object to see approximately how long it took to download the complete object. The relative proportions for each event of the download process can also be seen.

If the mouse is moved over a colored bar, two things will happen:

A tool tip will pop up (in 4.x version of the browsers) showing the full URL for the specific object. This allows you to see what object the bars denote.

The status line at the bottom of the browser window will also tell you what object you are looking at.

If you click on one of the colored bars in an object's timeline, the statistics for that object will be put into the floating Stats View window. The Stats window shows the exact times for each download step (in seconds), as well as the total download time for the object, its size, the HTTP status code, IP address, type and if it was generated by a secure server.

The Summary footer 18 of the Object View summarizes the data collected for the Web page you are measuring. The Summary footer 18 includes: total time; total size; total objects; and view stats. Total time is the end-to-end time (in seconds) for the page download, from the start of the first object to the end of the last object. Total size is the sum of all the object sizes on the page (in bytes). Total objects is the total number of objects contained in the page. (Each row in the Object View timeline table is a separate object.) View stats displays the floating Stats View Window.

Icon columns 20 are three columns preceding every object's performance information. 1st icon column—Indicates whether the object was generated by a secure server. If it was, the secure icon 30 (shown in FIG. 3) would appear in the first column, otherwise this column is blank. 2nd icon column—Denotes whether or not the object came from the original server. Each object measured is checked against the hostname shown in the URL Header. If the hostname matches, no icon is put into the column. If it differs, the off site icon 32 (shown in FIG. 3) is displayed to indicate that the object came from a different server than the one targeted, such as an ad or image server. 3rd icon column—has an icon which denotes what type of object that row is charting. Object types include: redirect; image; text/HTML; and Java/Script/other. Redirect is an HTTP redirection that tells the browser to look elsewhere for an object (very common when serving ads or load balancing across multiple servers). This is represented by the redirect icon 34 (shown in FIG. 3). Image is an image file or graphic (gif, jpeg). This is represented by the image icon 36 (shown in FIG. 3). Text/HTML is an HTML page or a frame that is part of a frameset. This is represented by the Text/HTML icon 38 (shown in FIG. 3). Java/Script/Other is anything else not listed above. Most often this denotes a Java applet that needed to be downloaded or a javascript include, but could also indicate an audio or video file. This is represented by the Java/Script/Other icon 40 (shown in FIG. 3).

Object Features to take particular notice of include parallelization and parsing/downloading. Parallelization is when some objects in the Object View are collected in parallel. Object rows of colored bars that overlap on the timeline horizontal axis were being collected in parallel. This is a normal web browser operation. Once an HTML page is loaded, the browser may know about a number of images that need to be downloaded. It will request those objects in parallel from the server in the hopes of decreasing the total time to download the page. The default setting of Netscape is to download 4 objects in parallel. Parsing and downloading is when the downloading of referenced objects does not depend on the complete HTML object file content to be downloaded first. As content is received in the browser, it is being parsed. As soon as a fully qualified reference to an object is encountered, the data file for that object will be requested. Therefore, objects are seen as being requested and downloaded while the HTML object file is still in the "download" stage.

Click on the View Stats button 22 (shown in FIG. 2) in the Web Performance Timeline page Summary footer.

Figure 4:
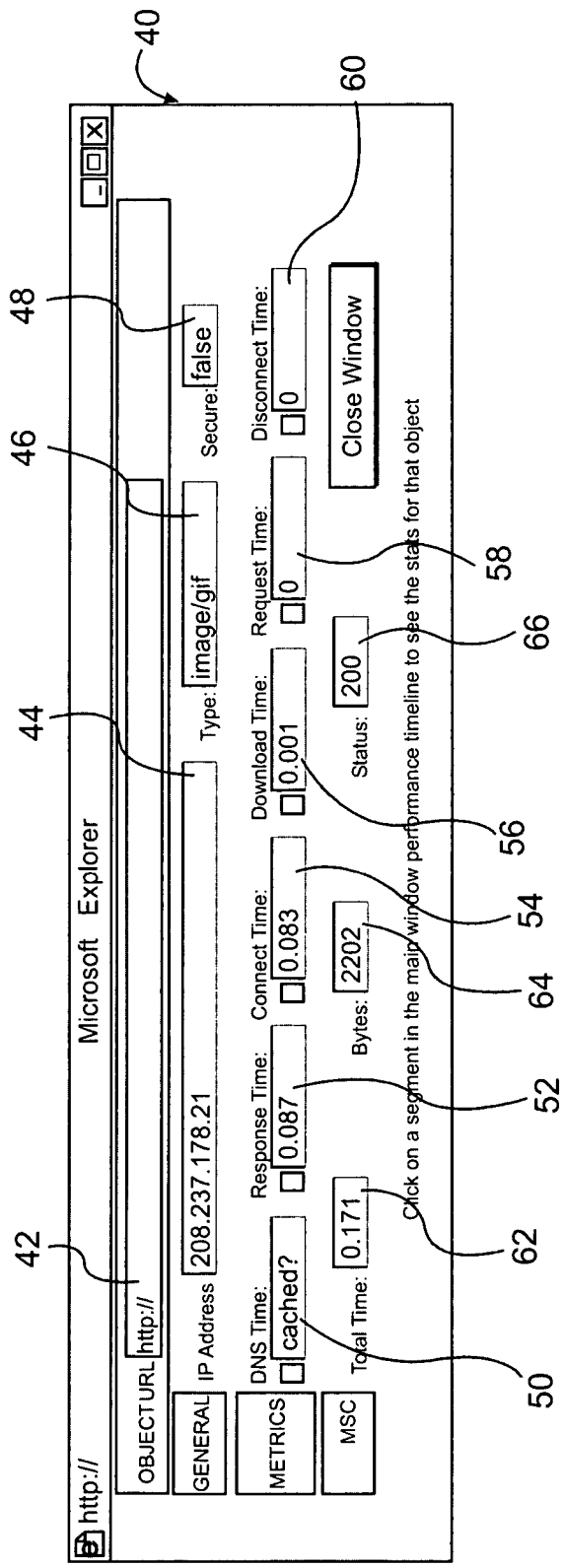

Referring to FIG. 4, the Stats View window 40 shows the statistics for the most recently selected (clicked on) object in the Object View timeline. Times shown in the Stats View window are in seconds. OBJECT URL 42 is the complete URL of the most recently selected (clicked on) object. IP Address 44 is the specific IP address that was used to get the object. Since a hostname may resolve to multiple IP addresses, the one we use is tracked in case one IP in a server farm breaks. Type 46 is the MIME type of the object. It correlates to the icon you would see in the third icon column in the Object View. Secure 48 denotes whether or not the object was generated by a secure server. DNS Time—The time it took to resolve the DNS for the hostname of the URL. If the DNS was previously resolved on this page, it will be cached and the value will be listed as "cached" (in seconds). Connection Time 50 is the time to connect to the server across the network (in seconds). Request Time 58 is the time to send the HTTP request to the server (in seconds). Response Time 52 is the time for the server to respond with the first byte of content. Download Time 56 is the time for the object to be fully transferred from the server to the browser. Disconnect Time 60 is the time for the network connection to be closed (in seconds). Total Time 62 is the sum of the DNS, Connect, Request, Response, Download, and Disconnect times (in seconds). Bytes 64 is the total size of the object, including headers (in bytes). Status 66 is the HTTP status code which corresponds to: 1xx Informational; 2xx Successful; 3xx Redirection; 4xx Client Error; and 5xx Server Error.

Figure 5:
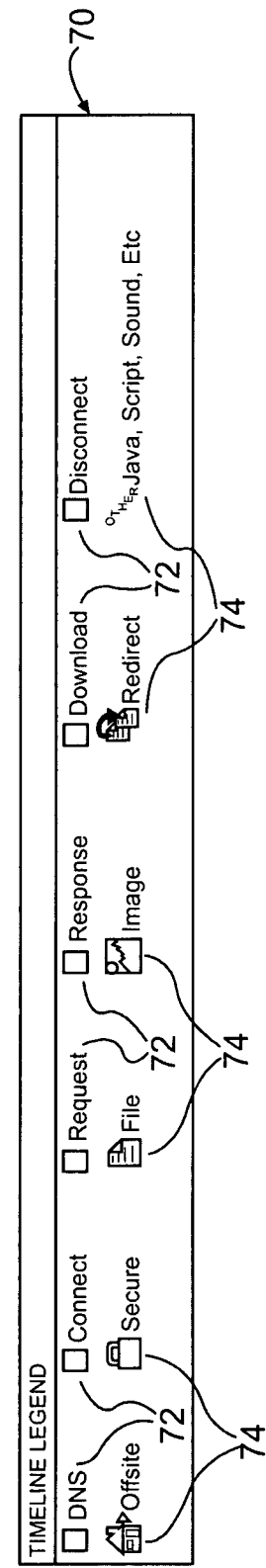

Referring to FIG. 5 there can be seen the Timeline Legend section 70 of the Web Performance Time Line which explains the colors 72 and icons 74 used in Object View. Each object that is presented in the Object View has a set of icons associated with it, explaining what type of object it is, and associated properties. Additionally, colored bars for each event segment represent each object's performance characteristics. The colors of the bars that represent measured events for the timeline in the Object View are listed in the Timeline Legend.

Figure 6:
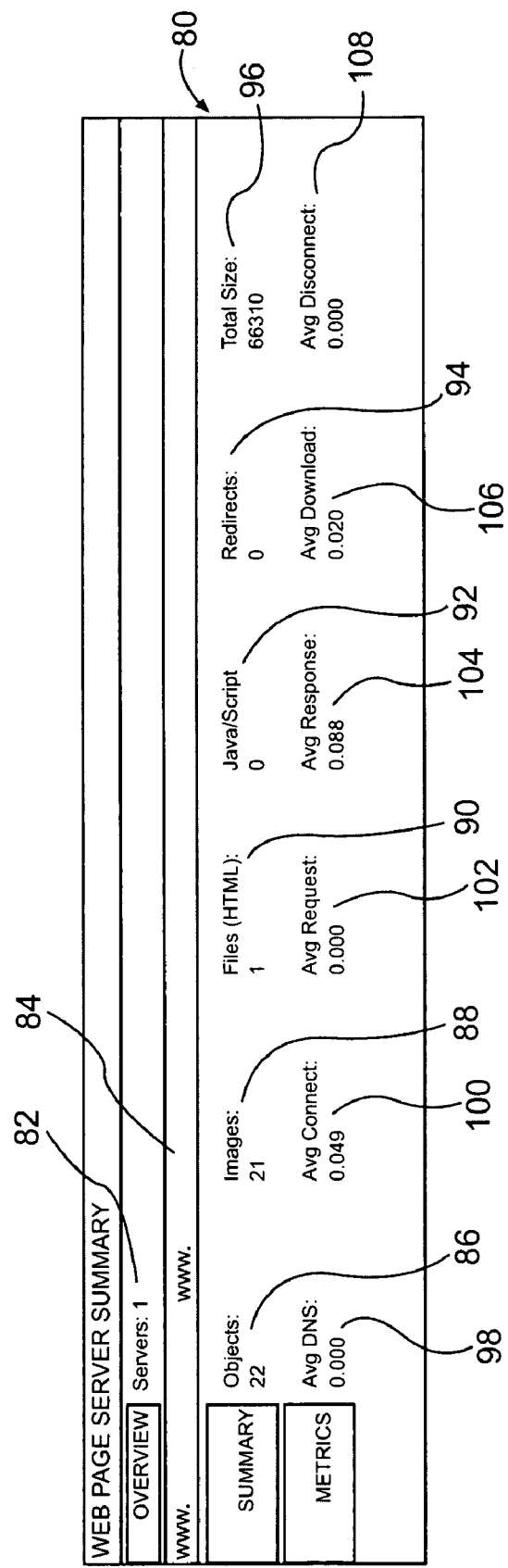

Referring to FIG. 6 there can be seen the Web Page Server Summary section 80 of the Web Performance Time Line that decomposes all the servers that went into creating the page. Several servers may be responsible for creating one page. One inefficient server can significantly impact the overall performance of the page. The servers that contribute content may be run and managed by parties other than that of the web site owner.

For each server involved data is listed. This data includes: Overview 82; Hostname and IP Address 84; objects 86; images 88; files 90; Java/Script/Other 92; redirects 94; total size 96; average DNS 98; average connect 100; average request 102; average response 104; average download 106; and average disconnect 108.

Overview 82 indicates the number of servers contacted. Hostname and IP Address 84 is the specific hostname and IP address used to determine which server to contact. Note that a hostname may map to multiple IP addresses so it may be valuable to see which actual machine behind a hostname served up the objects. Objects 86 are the total number of objects served from this server. Objects is basically the number of times that the server needed to be contacted to collect its content for the page. Images 88 are the number of images transferred by the server. Files 90 are the number of text based files (HTML, frames, plain text) transferred by the server. Java/Script/Other 92 are any other objects (excluding images and text files) transferred by the server, usually java applets or javascript includes, but may be other items such as background audio files. Redirects 94 are the number of redirects issued by the server. Total Size 96 is the total number of bytes transferred from this server. The number of bytes served includes all HTTP headers returned in addition to the page content. Average DNS 98 is the average time (across multiple looks) that it took to resolve the DNS for this hostname. If the server is referenced by IP address only, this will either be denoted as "0" or "possibly cached". Average Connection 100 is the average time in seconds it took to connect to the server. (The TCP/IP connection time between the browser and server.) Average Request 102 is the average time in seconds it took to send HTTP requests to the server. Average Response 104 is the average time it took for the server to respond with the first byte of content. Note that we are very specific in our meaning of "the first byte of content". This is very different than the first byte returned. For non-flat file objects, there are two ways dynamic data can be returned:

Header, <processing>, content

<processing>, Header, content

If the Web Performance Time Line just measured the time to get the first byte back, servers and CGI/dynamically served pages which send the header back instantaneously would cause the Web Performance Time Line to erroneously report the time it took to process the request and respond. By waiting for the first byte of content to come back, the Web Performance Time Line can effectively normalize over these two options and best capture back-end processing time for a request.

Average Download 106 is the average time in seconds it took to download all the data for the object. Average Disconnect 108 is the average time in seconds it took to disconnect the TCP/IP connection between the browser and server.

The URL Configuration section displays the agent parameters used in the measurement process.

1.—URL DESCRIPTION—The URL target for measurement.
2.—USER AGENT—
3.—DOWNLOAD FRAMES—
4.—DOWNLOAD IMAGES—
5.—ALLOW REDIRECTS—
6.—USE PROXY AUTH—
7.—USE WEB AUTH—
8.—USE COOKIES—
9.—KEEP NEW COOKIE—
10.—PROXY USER NAME—
11.—POST DATA—
12.—COOKIE DATA—

The second component of the system actually takes the measurements and provides the measurement data needed by the user interface to report the performance characteristics. The measurement collection component comprises at least one Data Collection Agent (DCA). A DCA is a computer operating on a network and configured with software that is controlled remotely from another location on the network to locate a particular web page using the URL of the web page and to download the files that make up the web page using HTTP during which the time required to download each file is measured, recorded and transmitted back to the remote location that requested the download. Preferably, multiple DCAs are placed strategically throughout the Internet that act as web browsers and poll web sites on command to measure the download performance of the web page from that selected location.

The DCA software includes a browser component configured to operate current HTTP versions such as HTTP 1.0 and HTTP 1.1. Browsers of the type suitable for this purpose can include Internet Explorer by Microsoft of Redmond, Wash. or Navigator by Netscape Communications Corp. of Sunnyvale, Calif. Preferably, the browser component of the DCA is configured to realistically emulate a web page download from the commercially available browser configurations available. Thus, as browser versions are improved the browser component of the DCA would be updated. When given a URL as input, the browser emulator component is responsible for looking up a target Web server (e.g. using the Domain Name System), connecting to a Web server, requesting content objects using HTTP, and then receiving server replies and the actual content objects. The browser component is multi-threaded to allow for the download of multiple files at the same time in the same manner that commercially available browsers download files. In addition, the browser component parses various content objects such as HTML and Java scripts in order to determine all of the file components that need to be downloaded to completely build a target web page. The browser component further operates with a browser cache so that it will not perform duplicate or redundant downloads. The browser is further configurable according the currently available configuration options of commercial browsers to allow for the DCA to accurately emulate the download performance of a user operating a specific commercial browser. In this way a DCA can test various browser configuration and commercial versions to provide unique performance measurement corresponding to actual users. The DCA also includes a dynamic server component that controls the browser emulator component and listens for requests to download Web pages. When a request to measure a Web page download arrives, the dynamic server allocates a browser emulator to download the page and measure the web page download time. As the download is completed, the dynamic server sends the associated measurement data back to the client that requested the download measurement. The client in this case is either the user interface component or an intermediary acting on behalf of that component.

Figure 8:
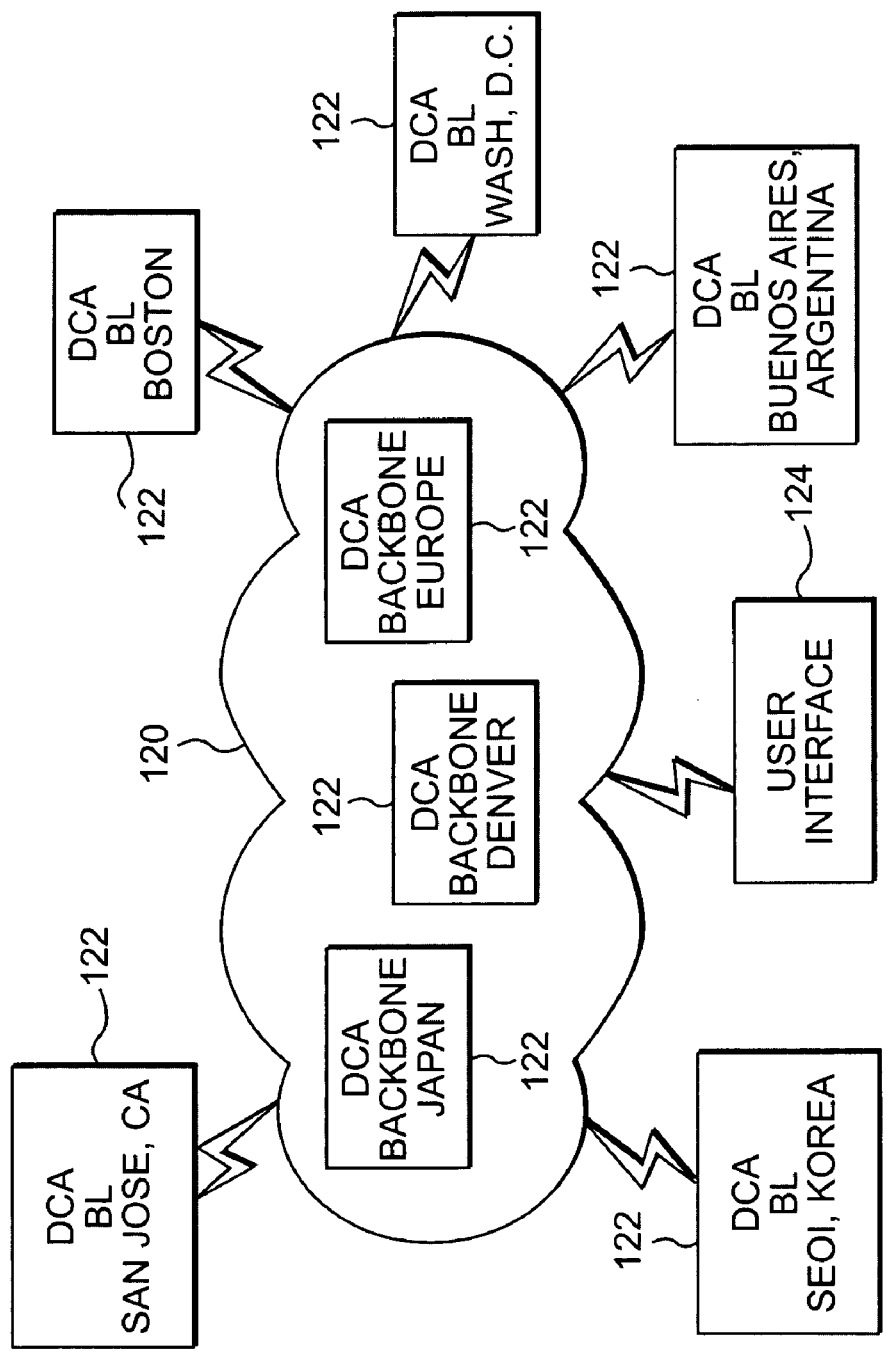
FIG. 8 is a block diagram of data collection agents distributed throughout the interconnected computer system networks according to the present invention.

In one embodiment of the present invention (FIG. 8) the process by which web page object-level data is collected and measured across the Internet 120 utilizes a number of data collection agents (DCAs) 122 sitting out in different locations across the Internet that report back information to the user through the user interface software 124. The location of these DCAs are placed strategically to provide information regarding performance at critical backbone communication links, between various peering links, between commercial network service providers, and at selected ISP locations. Preferably, DCAs would be located at all points along the Internet where there are changes in the network topology created by either changes in geography, traffic volume, hardware, software or network operators. These agents are connected to the Internet via different backbone providers and in different physical locations. A presently preferred DCA is composed of standard computer (such as a SUN Ultra 20) running browser emulation and measurement software. The DCA is connected to the Internet using a dedicated T1 line (running at 1.54 Mbps) or burstable bandwidth (running at greater than T1 speed) provided by a $3^{rd}$ party. The measurement and browser emulation software is functionally equivalent to a piece of software commonly called a "Web Browser". The measurement software (referred to hereafter as SM-Browser) uses the standard HTTP protocol to interact with a web server. A URL (which defines which web page the SM-Browser will analyze) is configured into the system. At regular intervals (or on demand as well) this URL is downloaded and measured. Downloaded refers to the process of requesting data be transferred from one source to another. In the case of SM-Browser, the requester is SM-Browser, the supplier of data is the targeted web server. The content of a downloaded URL may refer to more objects on a page (e.g. graphics, separate page frames, redirections, etc.). The SM-Browser, using the HTTP protocol, downloads the first object returned by the web server for the configured URL. The content returned is parsed apart following the industry standard HTML (HyperText Markup Language) formatting specification. This parsing recognizes other objects referenced in the content returned that need to be retrieved as well. The SM-Browser then retrieves all other objects referenced by the content (and any further content retrieved), thus retrieving all the objects (or components) of a "page". The retrieval of the multiple objects that may constitute a "complete" page occurs in parallel. While the retrieval of the object occurs, the SM-Browser measures performance times by timing parts of the retrieval process. These parts include, but are not limited to, resolution of DNS (or the conversion of a textual computer name on the internet into an IP address which is used by the computers to communicate with each other), TCP/IP network connection time, HTTP request acceptance time, time for the web server to respond with content, time to download the complete content/object, and time to disconnect the TCP/IP connection. The measurements also capture non-speed based information such as errors that might have occurred during the download, source of the content by IP address, and type of content that an object represents (e.g. image, text, audio file).

These measurements are made during the retrieval of each object that is part of the targeted URL (or page). These measurements are maintained in memory and then stored in a log file for further processing. In the case of on-demand measurement, these log file entries full of measurements are returned to the visualization application instantly. The application parses the log file lines apart and visually represents each measurement as it occurred chronologically for each object that was retrieved. Thus each measurement for each object can be visualized as a separate segment of the retrieval of an object in the visualization application.

Performance measurements use automated Web site visits to generate data for objective analysis of site performance. The objective performance measurements allow a user to isolate and troubleshoot sources of performance problems from different locations throughout the Internet. Armed with actionable data categorized by component (e.g. network connection, hardware, ISP), managers can prioritize problems and select from available options, the most cost-effective solution.

Backbone Specific Agents (BSAs) and Multi-housed Agents (MHAs) are used to distinguish between peering issues and geographic issues. Peering agreements between network service providers can determine the communication speed and clarity with which data may be transmitted between two network service providers. Data transmitted between two geographically distant sites connected by a peering agreement may be transmitted more rapidly than between two geographically proximate sites. Thus, a Web site in Seattle may perform better for a customer in New York than for one in Denver. This is because of the way the underlying network providers work with each other. When DCAs are placed throughout the Internet, their measurements allows for an objective examination of such network configurations in relation delivering web pages to end users and provides data to improve performance from every location.

Measurements can occur systematically from multiple geographic and network locations, representing diverse user populations and network backbones/ISPs. The Web Performance Timeline feature provides in-depth performance data on concurrent Web object download events. This feature provides Web site managers with an unprecedented level of performance information reporting. The data captured and presented can be combined to provide a variety functional tools to the user. Those skilled in the art will appreciate by polling several DCA under different browser configurations that such functional tools can include:

means for determining the time for a customer to view a Web page;

means for measuring a web site's performance vary by regional location or the network connectivity of the end-user;

means for determining a customer's experience by time of day and day of the week;

means for determining the origination of Internet-related performance problems;

means for comparing download performance compare to industry standards or competitive Web sites;

means for monitoring download performance changes since the last hardware/software/design investment to the web site;

means for monitoring access refusals due to traffic overload;

means for monitoring the rate that incomplete pages served;

means for monitoring performance over time to obtain performance trends as to whether web site access is getting better or worse over time;

means for monitoring performance in relation to performance thresholds such as corporate goals and acceptable levels;

means for determining web site performance improvements; and means for determining vendor weaknesses contributing to poor Web site performance.

It will be appreciated with the advent of wireless communication devices capable of downloading and viewing remotely readable information from the Internet such as personal data assistants (PDAs), beepers and wireless messaging services, and cellular telephones that the DCA browser emulation software can include emulations capable of downloading documents and other information tailored to wireless devices. Thus, allowing for an objective of examination of the download and review of wireless information as well.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. A method for Internet performance monitoring and analysis comprising, by a data collection agent (DCA), a DCA being a computer operating on the Internet and configured with software that is controlled remotely from another location on the Internet:

responsive to a request from another location, said request including an indication of a web page, collecting web page object-level data with said DCA;

measuring access to web page objects in the web page; and transmitting measured information about the access to the web page back to the location that made the request.

2. The method as recited in claim 1 wherein the measuring further comprises capturing non-speed based information including errors during download, source of content by IP address, and type of content that an object represents.

3. The method as recited in claim 1 wherein the measuring utilizes an HTTP protocol to interact with a web server.

4. The method as recited in claim 1 further comprising requesting data be transferred from one source to another.

5. The method as recited in claim 4 wherein the requesting occurs automatically.

6. The method as recited in claim 1 wherein the measuring further comprises parsing and recognizing other objects referenced in a content returned that also need to be retrieved.

7. The method as recited in claim 6 further comprising retrieving: the other objects referenced in the content.

8. A system for performance monitoring and analysis through a Computer network comprising:

(A) at least one data collection agent (DCA) connected to said computer network and configured with software that is controlled remotely from another location on the network and under the control of software to:

(a1) in response to a request from the other location, collect object-level data relating to a web page, (a2) measure access parameters including performance metrics for objects of the web page while the collection of the object-level data occurs; and (a3) transmit measurement data back to the remote location that requested the download; and (B) a user interface component to receive measurement data from said agent.

9. A system for performance monitoring and analysis of web pages from a server through a global computer network comprising:
- a plurality of data collection agents (DCAs) located at distributed points throughout said global computer network; each of the DCAs configured with software that is controlled remotely from another location on the network, and each of said agents being under the control of software to, responsive to requests from the other location, collect object level data and to measure access parameters while the collection of the object-level data occurs; and
- a monitoring component at the other location to receive measurement data from said agents.

10. The system for performance monitoring and analysis through a global computer network as recited in claim 9 further comprising a mechanism constructed and adapted to determine the time for a customer to view a Web page.

11. The system for performance monitoring and analysis through a global computer network as recited in claim 9 further comprising a mechanism constructed and adapted to measure variations in a website's performance by regional location or the network connectivity of an end-user.

12. The system for performance monitoring and analysis through a global computer network as recited in claim 9 further comprising a mechanism constructed and adapted to determine a customer's experience by time of day and day of the week.

13. The system for performance monitoring and analysis through a global computer network as recited in claim 9, wherein the network is the Internet, the system further comprising a mechanism constructed and adapted to determine the origination of Internet-related performance problems.

14. The system for performance monitoring and analysis through a global computer network as recited in claim 9 further comprising a mechanism constructed and adapted to compare download performance compared to industry standards or competitive websites.

15. The system for performance monitoring and analysis through a global computer network as recited in claim 9 further comprising a mechanism constructed and adapted to monitor download performance changes since the last hardware/software/design in investment to the website.

16. The system for performance monitoring and analysis through a global computer network as recited in claim 9 further comprising a mechanism constructed and adapted to monitor access refusals due to traffic overload.

17. The system for performance monitoring and analysis through a global computer network as recited in claim 9 further comprising a mechanism constructed and adapted to monitor a rate at which incomplete pages are served.

18. The system for performance monitoring and analysis through a global computer network as recited in claim 9 further comprising a mechanism constructed and adapted to monitor performance over time to obtain performance trends as to whether website access is getting better or worse over time.

19. The system for performance monitoring and analysis through a global computer network as recited in claim 9 further comprising a mechanism constructed and adapted to monitor performance in relation to performance thresholds including corporate goals or acceptable levels.

20. The system for performance monitoring and analysis through a global computer network as recited in claim 9 further comprising a mechanism constructed and adapted to determine website performance improvements.

21. The system for performance monitoring and analysis through a global computer network as recited in claim 9 further comprising a mechanism constructed and adapted to determine vendor weaknesses contributing to poor website performance.

* * * * *